(12) United States Patent
Tsui (10) Patent No.: US 10,980,371 B2
(45) Date of Patent: Apr. 20, 2021

(54) CONVEYOR TOASTER FOR TOASTING A CUSTOMIZED PATTERN OF BROWNNESS ON BREAD

(71) Applicant: Digital Heat Technology Ltd., Hong Kong (CN)

(72) Inventor: Nam Tsui, Hong Kong (CN)

(73) Assignee: Digital Heat Technology Ltd., Hong Kong (CN)

( * ) Notice: Subject to any disclaimer, the term of this patent is extended or adjusted under 35 U.S.C. 154(b) by 187 days.

(21) Appl. No.: 16/395,374

(22) Filed: Apr. 26, 2019

(65) Prior Publication Data

US 2020/0337499 A1 Oct. 29, 2020

(51) Int. Cl.
*A47J 37/08* (2006.01)
*A47J 37/04* (2006.01)

(52) U.S. Cl.
CPC ....... *A47J 37/0892* (2013.01); *A47J 37/0857* (2013.01); *A47J 37/045* (2013.01)

(58) Field of Classification Search
CPC ...... A47J 37/045; A47J 37/08; A47J 37/0807; A47J 37/0814; A47J 37/0821; A47J 37/0857; A47J 37/0871; A47J 37/0892
USPC ........ 99/325, 327, 329 R, 329 RT, 331, 362, 99/373, 374, 385, 386, 388, 389, 99/390–393, 400, 423
See application file for complete search history.

(56) References Cited

U.S. PATENT DOCUMENTS

| 1,828,542 A * | 10/1931 | Padelford ........... A47J 37/0857 99/386 |
| 3,456,578 A * | 7/1969 | Pinsly .................... A47J 37/044 99/386 |
| 5,156,637 A * | 10/1992 | Wai-Ching .......... A47J 37/0892 99/388 |
| 5,943,948 A * | 8/1999 | Tanaka ................ A47J 37/0892 99/388 |
| 6,112,648 A * | 9/2000 | Origane .............. A47J 37/0892 99/388 |
| 2002/0113054 A1* | 8/2002 | Arel ..................... A47J 37/0871 219/388 |
| 2006/0243721 A1* | 11/2006 | Sorensen ................. A21B 3/04 219/401 |
| 2020/0253411 A1* | 8/2020 | Gray .................... A47J 37/0885 |

* cited by examiner

*Primary Examiner* — Hung D Nguyen
(74) *Attorney, Agent, or Firm* — Spruson & Ferguson (Hong Kong) Limited (57) ABSTRACT

A conveyor toaster for toasting a customized pattern with multiple levels of brownness on a surface of sliced bread is disclosed. The present invention provides an apparatus including a processor, a moistening chamber; and a heating chamber. The moistening chamber further includes a nozzle for discharging water to the sliced bread; and a sliding track allowing the nozzle to move along. The heating chamber further includes a plurality of heating elements. The processor is configured to control a pump motor for adjusting the amount of water discharged from the nozzle and a movement of the nozzle along the sliding track to coordinates determined according to the customized pattern for positioning the nozzle above a region on the sliced bread, wherein the amount of water discharged over the region is determined according to the coordinates and the customized pattern.

16 Claims, 8 Drawing Sheets

CONVEYOR TOASTER FOR TOASTING A CUSTOMIZED PATTERN OF BROWNNESS ON BREAD

FIELD OF THE INVENTION

The present invention relates to a conveyor toaster and, more particularly, to a conveyor toaster which is capable of toasting a customized pattern of brownness on a surface of sliced bread.

BACKGROUND

A conveyor toaster is generally an electric apparatus designed to continuously carry many slices of bread through the toaster chamber using conveyor belts for heating, thereby converting the sliced bread into toast. The heating elements can heat up very quickly and are positioned inside the toaster chamber along the conveyor belts, such that the sliced bread can be exposed to heat radiation for efficient toasting of each surface.

A toaster is operated by supplying electrical energy to the heating elements, and heating the sliced bread in the toaster using infrared (IR) energy. The toaster usually applies heat to the sliced bread for a few minutes, particularly for 2 to 4 minutes, with a toasting temperature in a range of approximately 120° C. and 160° C. As the bread contains proteins and carbohydrates, on the outer surfaces of the sliced bread the carbohydrates react with the amino acids from the proteins at high temperature and undergo Maillard reaction resulting in a caramelized brownish color. In the process, acetyl tetrahydropyridine (6-acetyl-1,2,3,4-tetrahydropyridine) and other chemicals are formed, which contributes to the unique appetizing flavor and taste of toasted bread.

A traditional toaster having one or more heating elements positioned close to the sliced bread can apply radiant heat directly to the bread, which can effectively toast each surface evenly. However, fresh-baked bread may lose moisture by evaporation and become stale bread after a few days, and toasting the stale bread may result in a toast which is hard and dry on the inside.

Accordingly, there is a need in the art to have an apparatus, preferably a conveyor toaster, which can increase the moisture of the sliced bread before applying radiant heat thereto. In particular, the toaster, operable as an Internet of Things (IoT) device, can precisely increase the moisture of selected regions of the sliced bread such that a customized pattern of brownness can be toasted on the outer surface of the sliced bread.

SUMMARY OF THE INVENTION

It is an object of the present disclosure to provide a conveyor toaster, operable as an Internet of Things (IoT) device, which is capable of toasting a customized pattern of brownness on a surface of sliced bread.

In accordance with certain embodiments of the present disclosure, an apparatus for toasting a customized pattern with multiple levels of brownness on sliced bread comprises a processor; a moistening chamber; and a heating chamber. The moistening chamber further comprises a nozzle for discharging water to the sliced bread; and a sliding track allowing the nozzle to move along. The heating chamber further comprises a plurality of heating elements. The processor is configured to control a pump motor for adjusting the amount of water discharged from the nozzle and a movement of the nozzle along the sliding track to coordinates determined according to the customized pattern for positioning the nozzle above a region on the sliced bread, wherein the amount of water discharged over the region is determined according to the coordinates as defined by the customized pattern.

In accordance with a further aspect of the present disclosure, the apparatus further comprises a feed roller, wherein the processor is configured to adjust a rotational speed of the feed roller for determining the level of brownness on the sliced bread. The feed roller drives the sliced bread into the apparatus from an inlet to an outlet through the moistening chamber and the heating chamber.

In accordance with a further aspect of the present disclosure, the apparatus further comprises a touch screen panel for inputting the customized pattern, and adjusting a moistening condition and a baking time for customizing the level of brownness.

In accordance with a further aspect of the present disclosure, the apparatus further comprises a tank and a refilling lid, wherein the refilling lid allows water or a beverage to be introduced to fill the tank, thereby the introduced water or the introduced beverage is pumped from the tank to the nozzle for discharge.

In accordance with a further aspect of the present disclosure, the apparatus further comprises an inlet door and an outlet door, wherein the inlet door and the outlet door are opened by rotating against a hinged end to a horizontal position, and are closed by reversely rotating against the hinged end to a vertical position. The inlet door and the outlet door each further comprises one or more conveyor belts for allowing the sliced bread to travel along.

In accordance with a further aspect of the present disclosure, the apparatus further comprises a wireless communication interface for communicating with an external device or a cloud database. The external device or the cloud database provides the customized pattern to the apparatus. The customized pattern is a pre-set pattern in the cloud database.

In accordance with yet a further aspect of the present disclosure, the wireless communication interface is configured to support cellular radio connections, Bluetooth, Wireless Body Area Network (WBAN), Near Field Communication (NFC), or a combination thereof.

In accordance with a further aspect of the present disclosure, the apparatus further comprises a wire link conveyor belt for the sliced bread to move along.

In accordance with a further aspect of the present disclosure, the heating elements are mounted above and below the wire link conveyor belt in the heating chamber such that the sliced bread is heated during transiting through the heating chamber.

In accordance with a further aspect of the present disclosure, the apparatus further comprises a plurality of height extenders for increasing a height of the moistening chamber and the heating chamber.

In accordance with a further aspect of the present disclosure, the apparatus further comprises a crumb tray beneath the heating chamber, wherein the crumb tray is a detachable slide-out tray for holding bread crumbs.

In accordance with a further aspect of the present disclosure, the amount of water discharged over the region is determined according to types of flour and ingredients of the sliced bread.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF THE DRAWINGS

The appended drawings, where like reference numerals refer to identical or functionally similar elements, contain figures of certain embodiments to further illustrate and clarify various aspects, advantages and features of the conveyor toaster as disclosed herein. It will be appreciated that these drawings and graphs depict only certain embodiments of the invention and are not intended to limit its scope. The conveyor toaster as disclosed herein will be described and explained with additional specificity and detail through the use of the accompanying drawings in which.

Skilled artisans will appreciate that elements in the figures are illustrated for simplicity and clarity and have not necessarily been depicted to scale.

DETAILED DESCRIPTION

The present disclosure generally relates to an apparatus which can increase the moisture of the sliced bread before applying radiant heat thereto. More specifically, but without limitation, the present disclosure relates to an intelligent conveyor toaster operable as an Internet of Things (IoT) device which can precisely increase the moisture of selected regions of the sliced bread such that a customized pattern of brownness can be toasted on the outer surface of the sliced bread.

The following detailed description, the toaster device is merely exemplary in nature and is not intended to limit the disclosure or its application and/or uses. It should be appreciated that a vast number of variations exist. The detailed description will enable those of ordinary skill in the art to implement an exemplary embodiment of the present disclosure without undue experimentation, and it is understood that various changes or modifications may be made in the function and arrangement of the device of operation described in the exemplary embodiment without departing from the scope of the present disclosure as set forth in the appended claims.

The term "Internet of Things (IoT) device" is used to refer to any device that has an addressable interface (e.g., an Internet protocol (IP) address, a Bluetooth identifier (ID), a near-field communication (NFC) ID, etc.) and can transmit information to one or more other devices over a wired or wireless connection. An IoT device may have an active communication interface, such as a modem, a transceiver, or the like. An IoT device may be controlled or monitored by a central processing unit (CPU), microprocessor, ASIC, or the like, and configured for connection to an IoT network or the Internet. The toaster implementing IoT is equipped with an addressable communications interface for performing data communication. In case the toaster does not have Internet-connectivity or wireless network is not present, the toaster may first be connected to other communication devices, such as external data transmitter, cell phones, desktop computers, laptop computers, or tablet computers, etc., and then connected to the Internet via the communication devices.

The term "cloud" is construed and interpreted in the sense of cloud computing or, synonymously, distributed computing over a network unless otherwise specified. "A server" as used herein is interpreted in the sense of computing. The one or more "database" may be, for example, electrical circuits, hard disks and/or other solid-state disks for storing data. Generally, a server is equipped with one or more processors for executing program instructions, and/or one or more storages for storing data. The server may be a standalone computing server or a distributed server in the cloud.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Furthermore, the term "about", when used in conjunction with a numerical value or range of values, refers preferably to a range that is within 10 percent, preferably within 5 percent, or more preferably within 1 percent of a value with which the term is associated. The use of any and all examples, or exemplary language (e.g., "such as") provided herein, is intended merely to illuminate the invention better and does not pose a limitation on the scope of the invention unless otherwise claimed. No language in the specification should be construed as indicating any non-claimed element as essential to the practice of the invention.

Terms such as "upper", "lower", "inner", "outer", "front", "rear", and variations thereof herein are used for ease of description to explain the positioning of one element relative to a second element, and are not intended to be limiting to a specific orientation or position. Terms such as "first", "second", and variations thereof herein are used to describe various elements, regions, sections, etc. and are not intended to be limiting.

Terms such as "connected", "in communication with", "mounted", and variations thereof herein are used broadly and encompass direct and indirect connections, communication and mountings; and are not restricted to electrical, physical or mechanical attachments, connections, or mountings.

Figure 1:
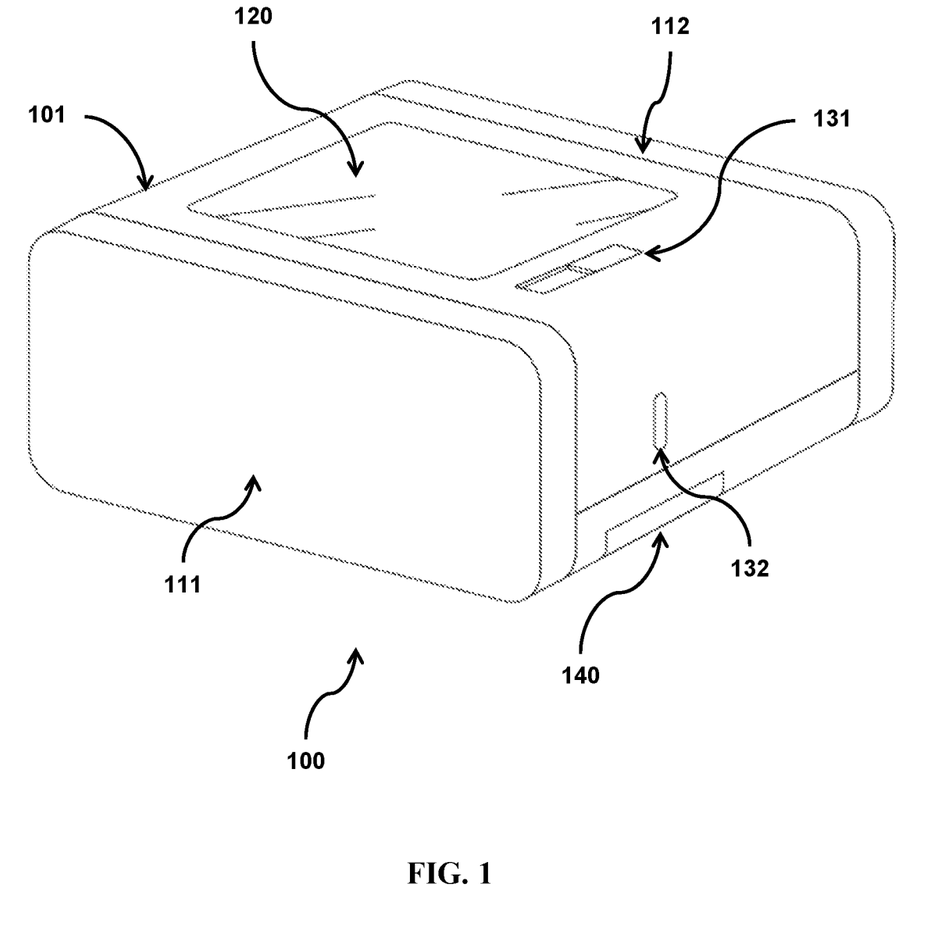
FIG. 1 is a perspective view of the conveyor toaster in accordance with an exemplary embodiment of the present disclosure.
Figure 2:
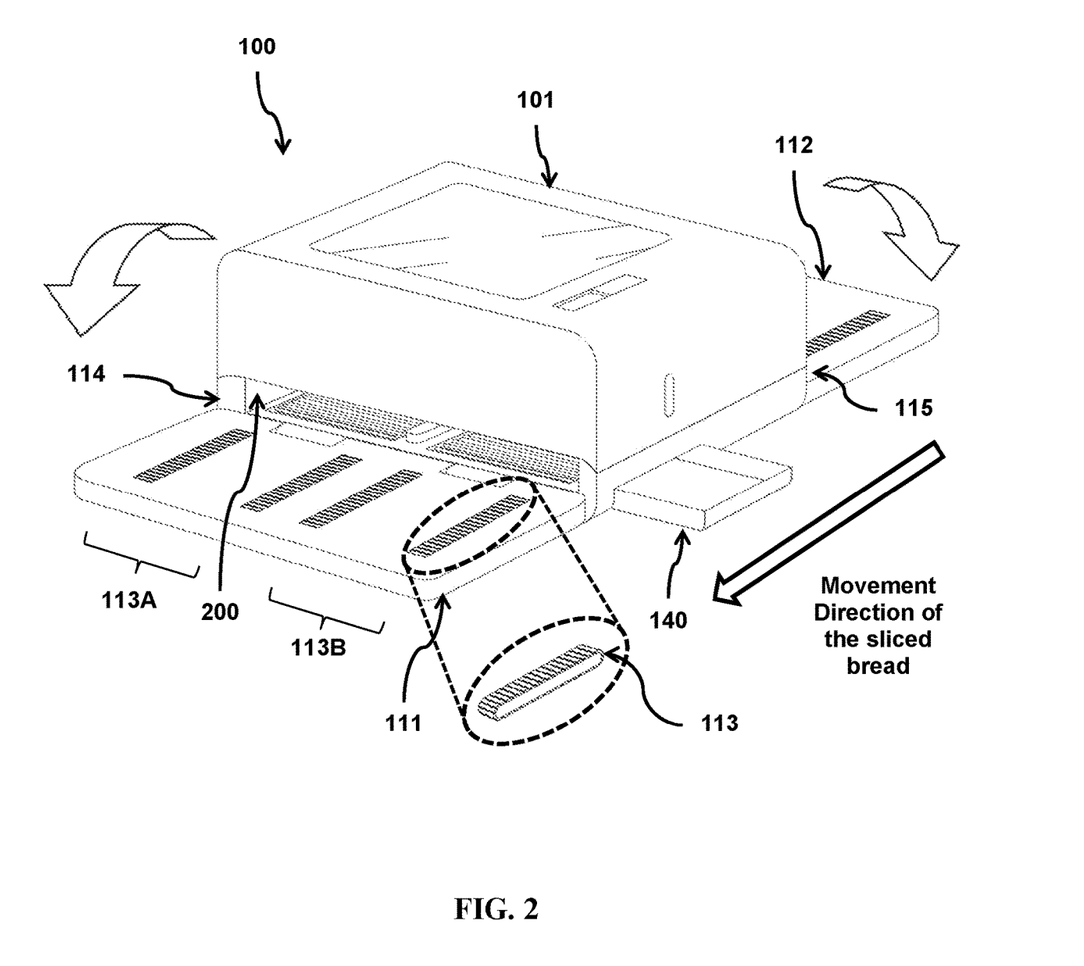
FIG. 2 is an operational view of the conveyor toaster of FIG. 1.

FIG. 1 illustrates a perspective view of the conveyor toaster 100. The conveyor toaster 100, comprising a main body 101, an outlet door 111, and an inlet door 112, is cuboid in shape when not in use at power off state. The inlet door 112 and the outlet door 111 are both closable with a hinged end at the bottom side, thereby they are closed by rotating against the hinged end and lowering to a vertical position (FIG. 1), and opened by reversely rotating against the hinged end and raising to a horizontal position (FIG. 2). The main body 101 houses a toaster chamber 200 (shown in FIG. 2) for toasting the sliced bread by radiant heat. On the top of the main body 101, there is provided a touch screen panel 120 for controlling and configuring the conveyor toaster 100 and a refilling lid 131 or a cap for introducing water thereto. The user may adjust the moistening condition and baking time to customize the brownness of the bread using the touch screen panel 120. In certain embodiments, other beverages may also be used instead of water for moistening the sliced bread and providing a special taste to the sliced bread, such as juice, milk, tea, and coconut water. A viewing window 132 for visually monitoring the remaining amount of water may be provided on the front side of the main body 101. Beneath the heating chamber 230 and proximate to the outlet door 111, there is provided a crumb tray 140, which is a detachable slide-out tray for holding bread crumbs or other dirt. FIG. 1 shows the crumb tray 140 at a collecting position for collecting the bread crumbs while FIG. 2 shows the crumb tray 140 at a slide-out position for removing the bread crumbs. Electrical power can be supplied to the conveyor toaster 100, which can be supplied from a battery, a power outlet, or alternatively through a voltage regulator. Interconnecting wiring and cables, power supply housing and other electronic parts may be used and may be positioned at the rear of the conveyor toaster 100. For convenience and simplicity, the electrical power and the respective electronic parts have not been shown in the figures.

Referring to FIG. 2, the inlet door 112 and the outlet door 111 are opened by rotating and lowering to a horizontal position during operation, to expose an inlet 115 for loading sliced bread to the conveyor toaster 100 and an outlet 114 for collecting toast. After loading the sliced bread from the inlet 115, a feed roller 210 (shown in FIG. 5A) rotates to drive the sliced bread through the toaster chamber 200 for moisturizing and toasting. A plurality of conveyor belts 113 are mounted on the inside surface of the inlet door 112 and on the inside surface of the outlet door 111. The conveyor toaster 100 in a preferred embodiment consists of four conveyor belts 113 on each side, whereas other numbers of conveyor belts 113 may also be employed. The conveyor belts 113 are endless belts which allow the sliced bread to travel along the same direction smoothly as the rotating movement thereof. The conveyor belts 113 form two conveyor systems 113A, 113B for conveying two pieces of sliced bread simultaneously. The conveyor belts 113 may not be motor driven, and the movement of the sliced bread can be driven by a feed roller 210 (shown in FIG. 5A) to convey the sliced bread through the toaster chamber 200 for toasting by radiant heat. Inside the toaster chamber 200, the sliced bread is driven to move along a movement path through the conveyor toaster 100 with direction as indicated in FIG. 2, on a wire link conveyor belt 211 (shown in FIG. 5A) or other metal supports.

Figure 3:
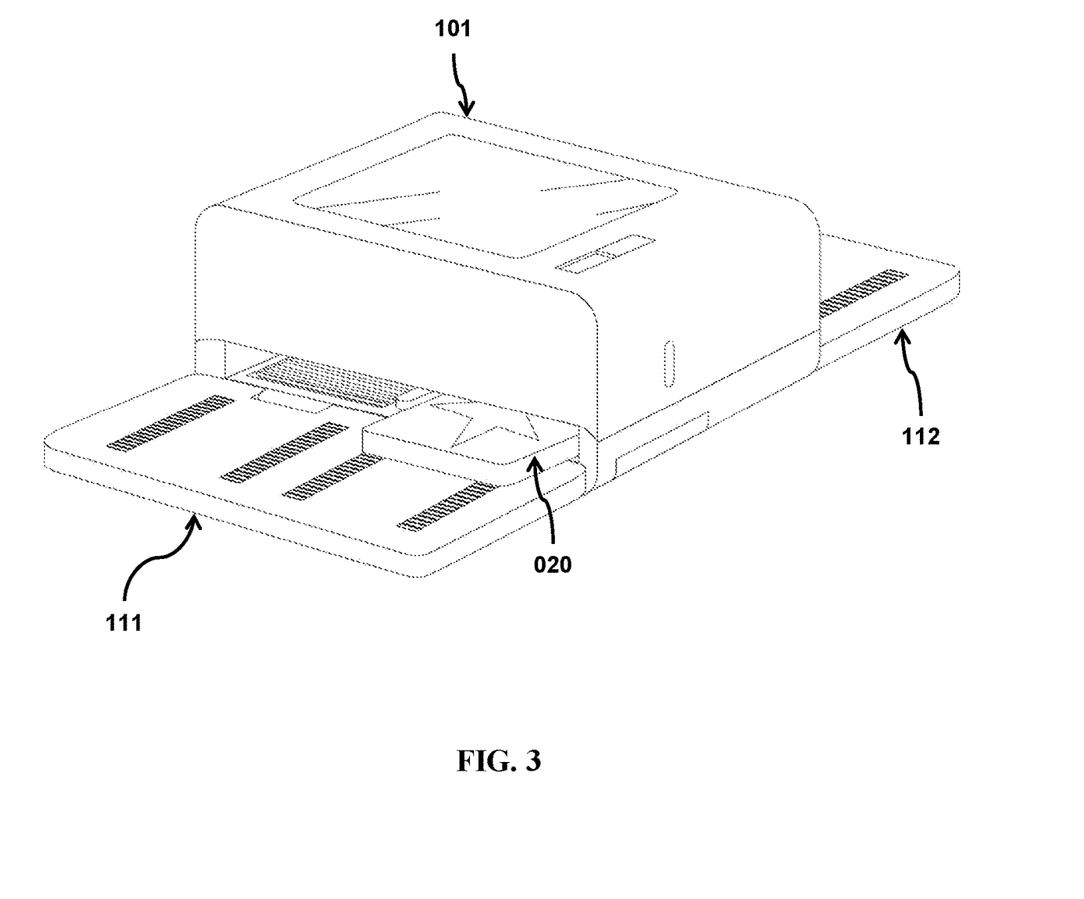
FIG. 3 illustrates the toasting of thinly sliced bread using the conveyor toaster of FIG. 1.
Figure 4:
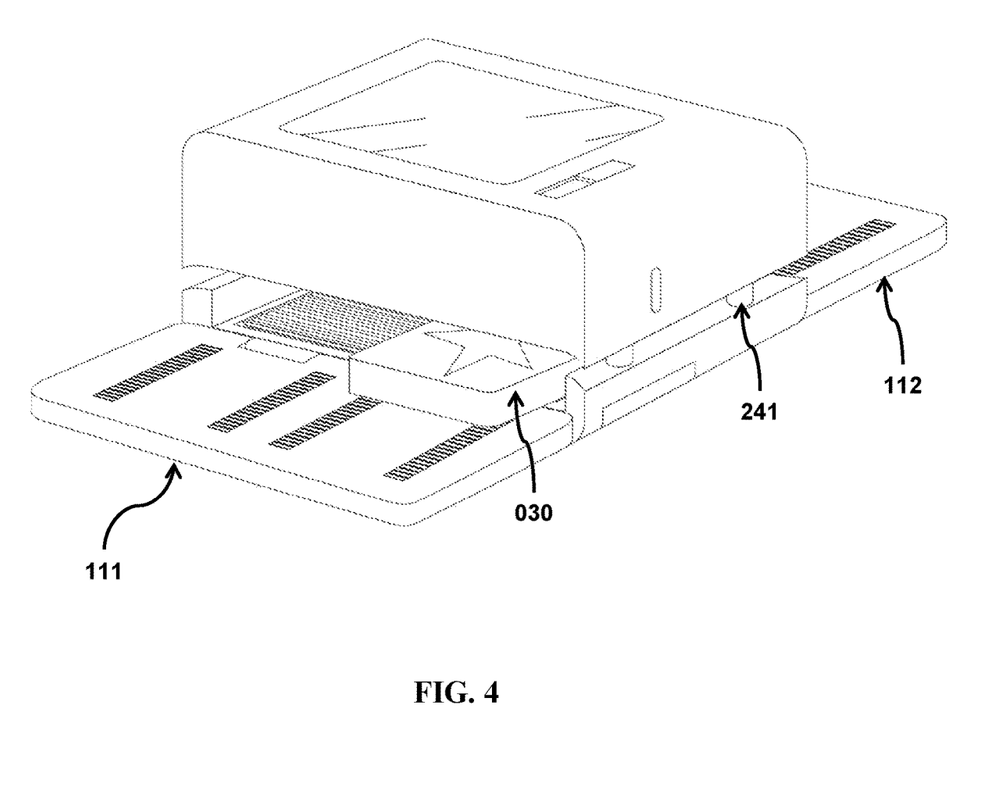
FIG. 4 illustrates the toasting of thick sliced bread using the conveyor toaster of FIG. 1.

FIGS. 3-4 further demonstrate the operation of the conveyor toaster 100 when toasting different types of sliced bread. The typical operation of the conveyor toaster 100 is shown in FIG. 3 when toasting thinly to medium sliced bread 020 of a thickness in the range of about 5 mm to 15 mm. In certain embodiments, the height of the inlet 115 and outlet 114 is approximately 17.5 mm. As shown in FIG. 4, the height of the toaster chamber 200 can be increased by extending the four height extenders 241 such that the upper portion of the main body 101 is raised and the toaster chamber 200 has a larger cavity. In certain embodiments, the height extenders 241 are controllable electrically and the user can raise the height using the touch screen panel 120. After the extension, the height of the inlet 115 and outlet 114 can be increased to approximately 30 mm, and the conveyor toaster 100 can accommodate and toast thick sliced bread 030 of a thickness in the range of about 15 mm to 25 mm.

Figure 5A:
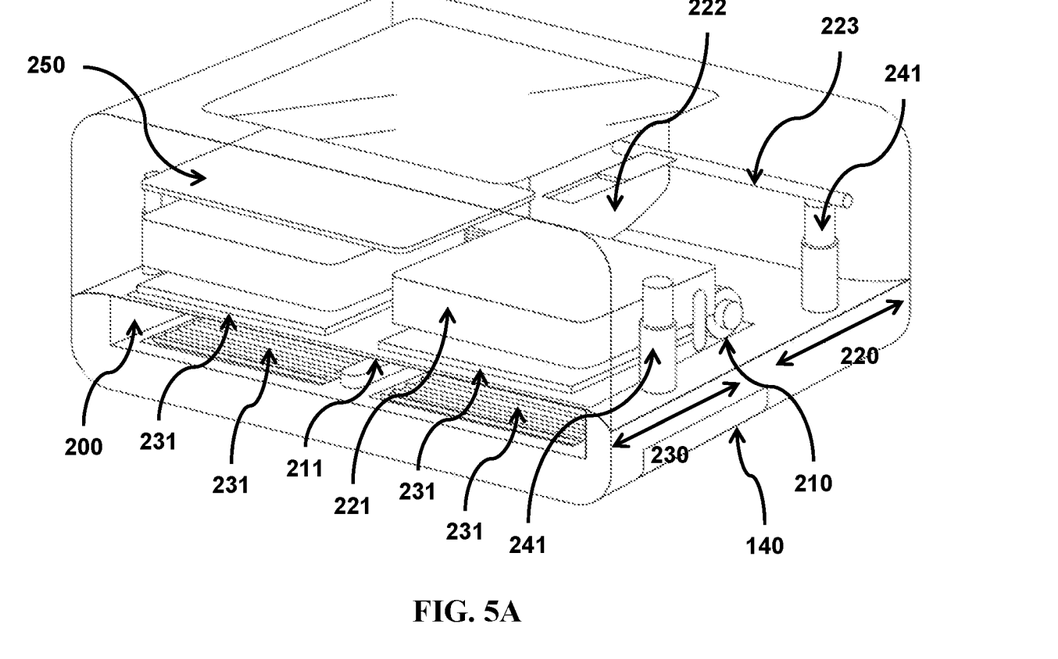
FIG. 5A is an internal view of the conveyor toaster of FIG. 1.
Figure 6:
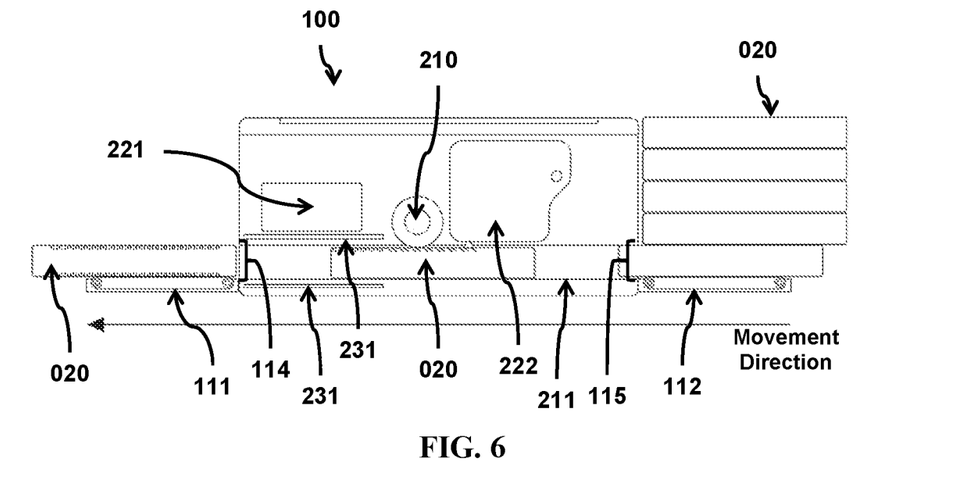
FIG. 6 illustrates an internal side view of the conveyor toaster of FIG. 1.

Referring to FIG. 5A, the internal structure of the conveyor toaster 100 is illustrated. For clarity, the outer shell of the main body 101 is transparent while the inlet door 112 and the outlet door 111 are not shown. FIG. 6 shows an internal side view of the conveyor toaster. The toaster chamber 200 comprises a moistening chamber 220 and a heating chamber 230. The moistening chamber 220 is closer to the inlet 115 and the heating chamber 230 is closer to the outlet 114. The moistening chamber 220 implements a water spraying system similar to an inkjet printer, comprising a nozzle 222 and a sliding track 223. The nozzle 222 is connected to a pump (not shown in the drawings) driven by a pump motor for pumping water from the tank 221 to the nozzle 222 for discharge. In certain embodiments, the pump is a centrifugal pump. The quantity of water and the corresponding water pressure are adjustable by the user. Water introduced from the refilling lid 131 fills the tank 221. The tank 221 may comprise a viewing window 132 for visually monitoring the remaining amount of water therein. The sliding track 223 is a track orientated perpendicular to the movement direction of the sliced bread and positioned near the top of the inlet 115, which allows the nozzle 222 to move along, as the movement of the nozzle 222 is precisely controlled by a step motor (not shown in the drawings).

At the middle of the toaster chamber 200, there is provided a feed roller 210 for driving sliced bread into the toaster chamber 200. The rotation speed of the feed roller 210 is adjustable to increase or decrease the dwell time of the sliced bread within the toaster chamber 200, thereby to lengthen or shorten the toasting time. The speed of the feed roller 210 is also carefully controlled and synchronized with the movement of the nozzle 222, therefore, the movement of the sliced bread by rotating the feed roller 210 and the movement of the nozzle 222 along the sliding track 223 are programmed based on 2D coordinates to form an array, whereby water can be directed to a region precisely defined. In operation of the conveyor toaster 100, sliced bread is placed on the inlet door 112 and feed into the toaster chamber 200 by the rotation of the feed roller 210. The feed roller 210 holds the sliced bread on the wire link conveyor belt 211 and drives the sliced bread to move slowly along a movement path through the conveyor toaster 100 from the inlet 115 to the outlet 114 at the other end of the toaster chamber 200.

Figure 5B:
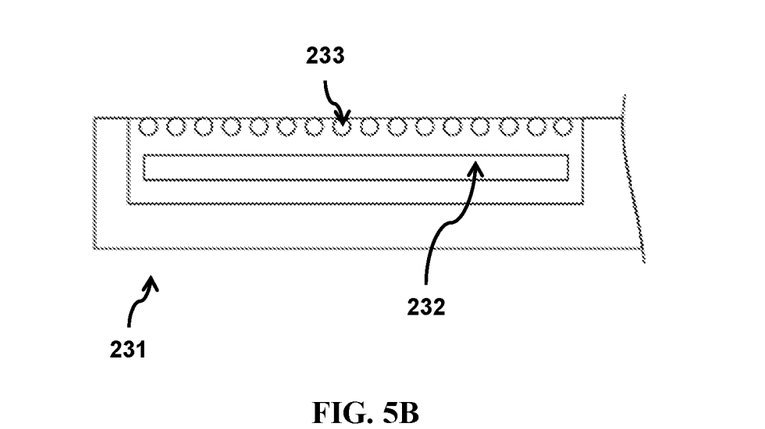
FIG. 5B is a cross-sectional view of a heating element.

Heating elements 231 are mounted above and below the wire link conveyor belt 211 in the heating chamber 230, which heat the sliced bread during transiting through the heating chamber 230 on the wire link conveyor belt 211. FIG. 5B provides a cross-sectional view of a heating element 231. The heating element 231 comprises a heating device 232 and a plurality of stainless steel tubes 233. The temperature of the heating device 232 is adjustable. The stainless steel tubes 233 can improve the heat transfer from the heating device 232 to the sliced bread on the wire link conveyor belt 211.

Inside the main body 101, there is provided a control circuit board 250 configured to execute one or more processors for (1) receiving input signals from the touch screen panel 120; (2) rotating the feed roller 210 at a predetermined speed to control the movement of the sliced bread; (3) controlling the flow of water from the tank 221 to the nozzle 222 through the pump by adjusting the speed of the pump motor; (4) controlling the movement of the nozzle 222 along the sliding track 223; (5) controlling the temperature of the heating elements 231; and (6) communicating to external devices or cloud database.

Figure 7:
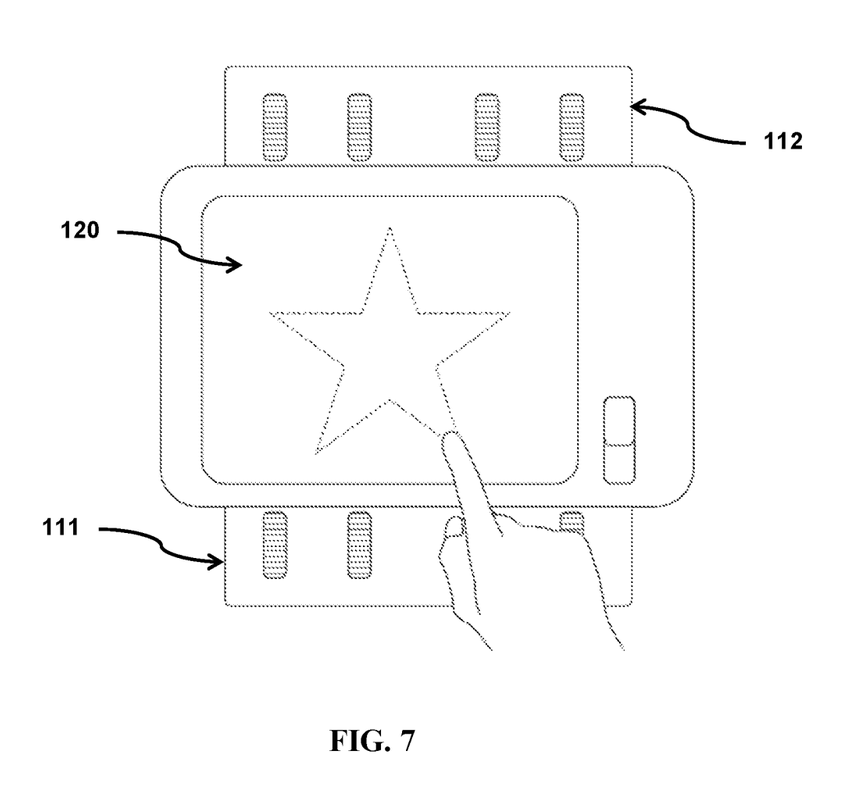
FIG. 7 illustrates a top view of the conveyor toaster of FIG. 1 when operating the touch screen.
Figure 8A:
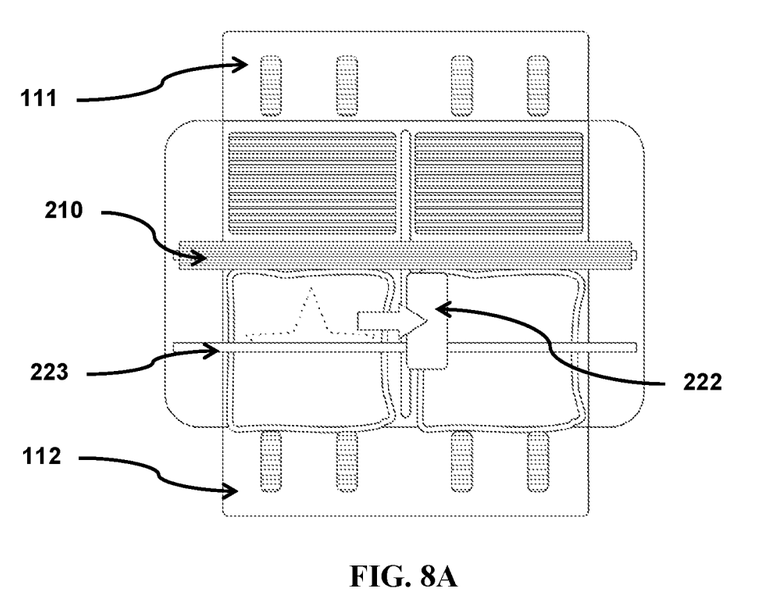
FIG. 8A illustrates a top view of the conveyor toaster of FIG. 1 when spraying water to the sliced bread.
Figure 8B:
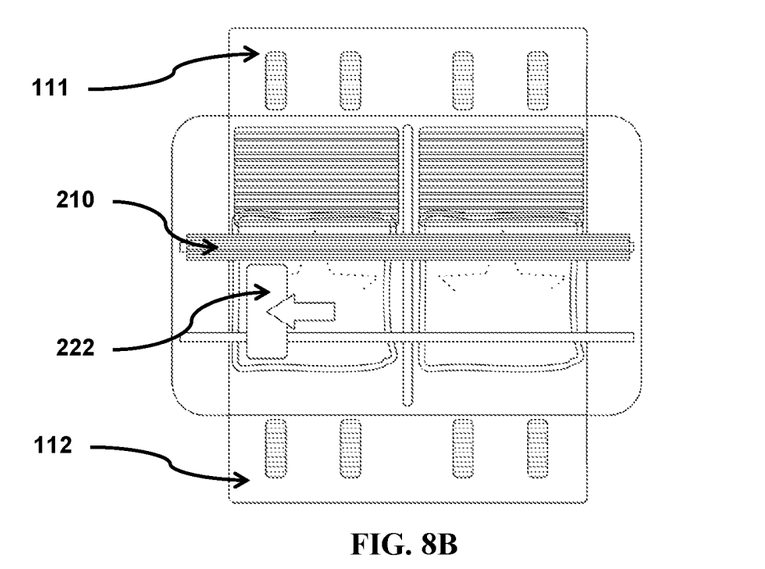
FIG. 8B illustrates a top view of the conveyor toaster of FIG. 1 when spraying water to the sliced bread.
Figure 8C:
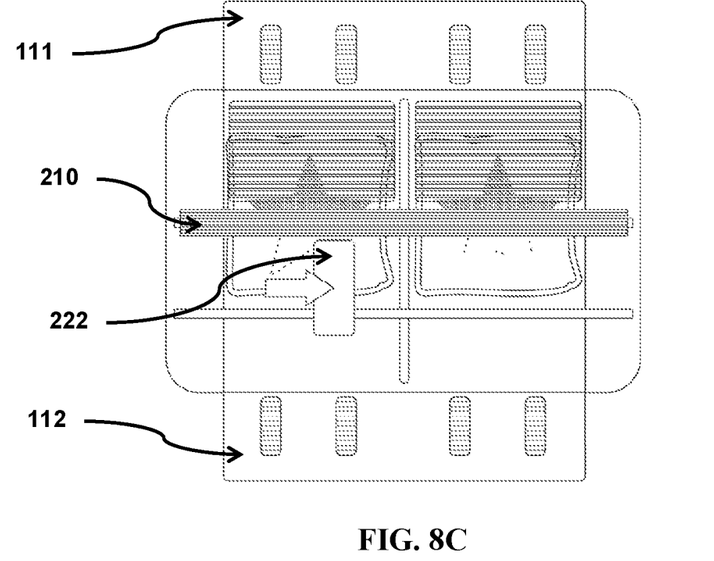
FIG. 8C illustrates a top view of the conveyor toaster of FIG. 1 when spraying water to the sliced bread.
Figure 8D:
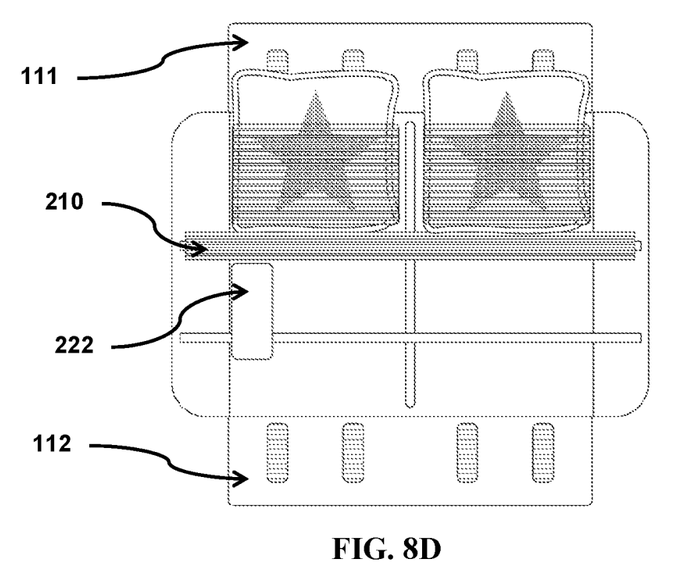
FIG. 8D illustrates a top view of the conveyor toaster of FIG. 1 after baking the sliced bread.

As illustrated in FIG. 7, the touch screen panel 120 using a liquid crystal display (LCD) is implemented as the control panel. The user can control the conveyor toaster 100 by selecting the mode of operation, selecting the type of bread, inputting pattern to be printed on the sliced bread, checking the toasting status, and adjusting the rotational speed of the feed roller 210 to determine the brownness of the toast. The pattern determines the coordinates of the regions on the sliced bread for increasing moisture, such that upon applying radiant heat in the heating chamber, the added moisture is evaporated and the level of brownness is lowered.

Referring to FIGS. 8A-8D, two pieces of sliced bread are first placed on the inlet door 112, and then inserted into the conveyor toaster 100 from the inlet 115. Once the two pieces of sliced bread are in contact with the feed roller 210, the feed roller 210 can drive the sliced bread into the conveyor toaster 100 and through the toaster chamber 200. The nozzle 222 moves along the sliding track 223 and discharges water to the sliced bread at locations in accordance with the pattern inputted by the user on the touch screen 120. The nozzle 222 may move along the sliding track 223 back and forth for one or more cycles in order to discharge water to all required regions on the sliced bread. As the feed roller 210 continues to rotate to drive the sliced bread forward into the heating chamber 230, the heating elements 231 provide heat to obtain a toast at the outlet 111 with the selected pattern thereon.

Advantageously, with a customized pattern, the processors can precisely control the amount of water discharged from the nozzle 222, such that the moisture at each region of the sliced bread can be increased precisely before applying radiant heat thereto. In particular, the processor can control the speed of the pump motor to adjust the amount of water discharged from the nozzle 222. The processor can also control the movement of the nozzle 222 along the sliding track 223 for positioning the nozzle 222 above the region on the sliced bread in accordance with the coordinates as defined by the customized pattern, such that the moisture of the region is increased, thereby to prevent the region from having a certain level of brownness after applying radiant heat thereto.

As it is known that a small amount of moisture is needed in the sliced bread from a molecular level to aid the toasting process and browning effect, while too much water may make the toasting ineffective as the heating elements 231 can only evaporate the water without effectively toasting the bread. Therefore, by controlling the surface moisture of the sliced bread before applying radiant heat thereto, the brownness of the toast can be customized. The present disclosure provides a novel system that can control the amount of moisture at each region for toasting a customized pattern with multiple levels of brownness on the sliced bread.

The sliced bread can be made of different types of flour and ingredients to give a unique flavor and nutritional or dietary benefit. Normally wheat flour is used to make bread. However, other types of flour, such as rye, barley, corn, oats, spiked millet, and sorghum can combine with wheat to make different varieties of sliced bread. Generally, the types of bread commonly consumed may include whole-wheat bread, white bread, multi-grain bread, flaxseed bread, oat bread, brown rice bread, rye bread, gluten-free bread, and Ezekiel bread. As different types of bread may have different optimal moistening and baking conditions, the conveyor toaster 100 in accordance with the present disclosure has pre-programmed conditions for different types of bread selectable by the user using the touch screen panel 120.

In case of stale bread, the system of the present disclosure can also increase the moisture of the stale bread to make it fresh again by discharging a small amount of water to the entire outer surface of the stale bread. As the stale bread has less moisture and usually hard to eat after toasting. By adding a small amount of water, the stale bread can restore the level of moisture such that the toasted stale bread can be as crispy as fresh bread.

The conveyor toaster 100 is operable as an IoT device, as the control circuit board 250 further comprises a wireless communication interface for communicating with external devices or cloud database. In certain embodiments, the wireless communication interface is configured to support one or more communication protocols, including cellular radio connections, Bluetooth, Wireless Body Area Network (WBAN), and Near Field Communication (NFC). In case the toaster does not have Internet-connectivity or wireless network is not present, the toaster may first be connected to other communication devices, such as external data transmitter, cell phones, desktop computers, laptop computers, or tablet computers, etc., and then connected to the Internet via the communication devices.

By operating as an IoT device, the conveyor toaster 100 can provide a report to external devices, wherein the report comprises temperature data, toasting status, error records, and other device information. The user can also use an external device to control the conveyor toaster 100 remotely, by adjusting the rotational speed of the feed roller 210, adjusting the amount of water discharged from the nozzle 222, controlling the temperature of the heating elements 231, controlling the amount of moisture at each region, and inputting pattern to be printed on the sliced bread. Pre-set patterns or templates can also be loaded from the cloud database to the conveyor toaster 100 for toasting sliced bread with the pre-set pattern.

The present disclosure may be embodied in other specific forms without departing from the spirit or essential characteristics thereof. The present embodiment is, therefore, to be considered in all respects as illustrative and not restrictive. The scope of the disclosure is indicated by the appended claims rather than by the foregoing description, and all changes that come within the meaning and range of equivalency of the claims are therefore intended to be embraced therein.

What is claimed is:

1. An apparatus for toasting a customized pattern with multiple levels of brownness on a sliced bread, the apparatus comprising:
   a processor;
   a moistening chamber; and
   a heating chamber;
   wherein:
     the moistening chamber further comprises:
       a nozzle for discharging water to the sliced bread; and
       a sliding track allowing the nozzle to move along;
     the heating chamber further comprises a plurality of heating elements; and
     the processor is configured to control a pump motor for adjusting the amount of water discharged from the nozzle and a movement of the nozzle along the sliding track to coordinates determined according to the customized pattern for positioning the nozzle above a region on the sliced bread, wherein the amount of water discharged over the region is determined according to the coordinates as defined by the customized pattern.

2. The apparatus of claim 1 further comprising a feed roller, wherein the processor is configured to adjust a rotational speed of the feed roller for determining the level of brownness on the sliced bread.

3. The apparatus of claim 2, wherein the feed roller drives the sliced bread into the apparatus from an inlet to an outlet through the moistening chamber and the heating chamber.

4. The apparatus of claim 1 further comprising a touch screen panel for inputting the customized pattern, and adjusting a moistening condition and a baking time for customizing the level of brownness.

5. The apparatus of claim 1 further comprising a tank and a refilling lid, wherein the refilling lid allows water or a beverage to be introduced to fill the tank, thereby the introduced water or the introduced beverage is pumped from the tank to the nozzle for discharge.

6. The apparatus of claim 1 further comprising an inlet door and an outlet door, wherein the inlet door and the outlet door are opened by rotating against a hinged end to a horizontal position, and are closed by reversely rotating against the hinged end to a vertical position.

7. The apparatus of claim 6, wherein the inlet door and the outlet door each further comprises one or more conveyor belts for allowing the sliced bread to travel along.

8. The apparatus of claim 1 further comprising a wireless communication interface for communicating with an external device or a cloud database.

9. The apparatus of claim 8, wherein the external device or the cloud database provides the customized pattern to the apparatus.

10. The apparatus of claim 9, wherein the customized pattern is a pre-set pattern in the cloud database.

11. The apparatus of claim 8, wherein the wireless communication interface is configured to support cellular radio connections, Bluetooth, Wireless Body Area Network (WBAN), Near Field Communication (NFC), or a combination thereof.

12. The apparatus of claim 1 further comprising a wire link conveyor belt for the sliced bread to move along.

13. The apparatus of claim 12, wherein the heating elements are mounted above and below the wire link conveyor belt in the heating chamber such that the sliced bread is heated during transiting through the heating chamber.

14. The apparatus of claim 1 further comprising a plurality of height extenders for increasing a height of the moistening chamber and the heating chamber.

15. The apparatus of claim 1 further comprising a crumb tray beneath the heating chamber, wherein the crumb tray is a detachable slide-out tray for holding bread crumbs.

16. The apparatus of claim 1, wherein the amount of water discharged over the region is determined according to types of flour and ingredients of the sliced bread.

\* \* \* \* \*